United States Patent
Kawada (10) Patent No.: US 7,911,528 B2
(45) Date of Patent: Mar. 22, 2011

(54) IMAGE PICKUP APPARATUS (75) Inventor: Kazutoshi Kawada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1118 days.

(21) Appl. No.: 11/404,614

(22) Filed: Apr. 13, 2006

(65) Prior Publication Data

US 2006/0244583 A1    Nov. 2, 2006

(30) Foreign Application Priority Data

Apr. 27, 2005 (JP) ................................. 2005-129328

(51) Int. Cl.
*B60Q 1/26* (2006.01)

(52) U.S. Cl. ...................... 348/360; 348/227.1; 348/363; 348/262

(58) Field of Classification Search ............ 348/89, 348/363, 262, 360; 396/81
See application file for complete search history.

(56) References Cited

U.S. PATENT DOCUMENTS

| | | | | |
|---|---|---|---|---|
| 5,319,416 A | * | 6/1994 | Takagi | 396/100 |
| 5,565,918 A | * | 10/1996 | Homma et al. | 348/364 |
| 6,215,961 B1 | * | 4/2001 | Mukai et al. | 396/100 |
| 7,239,344 B1 | * | 7/2007 | Ikoma et al. | 348/216.1 |
| 7,423,684 B2 | * | 9/2008 | Notagashira | 348/342 |
| 2004/0101296 A1 | | 5/2004 | Nakata et al. | |
| 2004/0141060 A1 | * | 7/2004 | Tsuji | 348/152 |
| 2005/0104998 A1 | * | 5/2005 | Udaka | 348/363 |

FOREIGN PATENT DOCUMENTS

| | | |
|---|---|---|
| JP | 02-141072 A | 5/1990 |
| JP | 07-131701 A | 5/1995 |
| JP | 2000-224469 A | 8/2000 |
| JP | 2001-45512 A | 2/2001 |
| JP | 2001-305601 A | 11/2001 |
| JP | 2004-004449 A | 1/2004 |

* cited by examiner

*Primary Examiner* — Jason Chan
*Assistant Examiner* — Yih-Sien Kao
(74) *Attorney, Agent, or Firm* — Canon U.S.A., Inc. I.P. Division (57) ABSTRACT

At least one exemplary embodiment is directed to an image pickup apparatus that has an external sensor for detecting brightness separately from an image sensor for obtaining an image pickup signal and controls the insertion and removal of a filter into and from an image pickup optical system in accordance with the brightness of the subject, using brightness information obtained from the external sensor and the image pickup signal.

2 Claims, 10 Drawing Sheets

IMAGE PICKUP APPARATUS

BACKGROUND OF THE INVENTION

1. Field of the Invention

The present invention relates to an optical apparatus and an image pickup apparatus, and more particularly, though not exclusively, to an image pickup apparatus capable of image pickup in at least two wavelength bands.

2. Description of the Related Art

A color image includes color information in addition to information of shape and brightness and is therefore useful in distinguishing a photographed object in a color image compared to a monochrome image. Therefore, normally, security cameras photograph color images. However, image sensors, such as a CCD, widely used in security cameras are sensitive to not only light in the visible wavelength range (between approximately 400 nm and 700 nm) but also light in the near-infrared wavelength range (more than approximately 700 nm). Therefore, if a color image is photographed using the information of all ranges to which the CCD is sensitive, the colors of the photographed color image is out of balance. Thus, the colors of the subject cannot be accurately reproduced. To solve this problem, when a color image is photographed, a near infrared light cut filter (hereinafter referred to as "IR cut filter") for cutting near infrared light is disposed in the optical path of the photographing light.

However, in the case of photographing a very dark subject, for example, at night outdoor or in a room with no illumination, the amount of incident light is insufficient. Therefore, the amplification factor of the image signal output from the image sensor is increased. However, large amplification of the color image signal deteriorates the signal-to-noise (S/N) ratio of the color signal and results in a noisy image. Thus, the outline or the shape of the subject becomes unclear. In addition, since color information decreases at low illuminance, the value of the color image decreases.

Therefore, in the case of photographing at low illuminance, conventional systems typically abandon obtaining color information deteriorating the S/N ratio, and image processing is performed on the basis of a monochrome image comprising luminance signals only. That is to say, the IR cut filter is removed from the optical path, and instead a dummy glass for correcting the optical path length is inserted. Since near infrared light can be added to the luminance information, it is possible to photograph the subject more clearly and brightly even at low illuminance. Such a photographing mode is called "night mode" and is discussed in Japanese Patent Laid-Open No. 2001-45512.

Japanese Patent Laid-Open No. 2001-45512 also discusses a technique called "automatic night mode" of automatically switching between the color and monochrome photographing modes. In addition, Japanese Patent Laid-Open No. 2000-224469 discusses a technique of automatically switching to the night mode when the illuminance of the subject decreases using an illuminance sensor for detecting the visible light illuminance of the subject provided separately from the image pickup optical system.

However, the above conventional image pickup apparatus, which can have the automatic night mode, can fail to perform appropriate automatic night mode operation. The first cause thereof is misdetection of the illuminance. The reason of the misdetection is, for example, that the illuminance detection range (angle of view) is larger than the imaging range (angle of view) of the image pickup optical system, or that the illuminance detection range does not exist within the imaging range of the image pickup optical system. No appropriate relationship between the illuminance detection range of the illuminance detection device and the imaging range of the image pickup optical system has been discussed.

The second cause is that the relationship between the imaging range (angle of view) changing with zoom operation and the timing when the IR cut filter is inserted or removed is inappropriate. Therefore, in the case where the imaging range and the illuminance detection range of the illuminance detection device change relative to each other, the apparatuses can fail to perform appropriate automatic night mode operation.

SUMMARY OF THE INVENTION

At least one exemplary embodiment is directed to an image pickup apparatus (e.g., a camera), that has a wavelength band selection device capable of being inserted into and removed from the optical path of the image pickup optical system and that is capable of image pickup in at least two wavelength bands, for example, visible light and infrared light.

At least one exemplary embodiment is directed to an image pickup apparatus that has a simple configuration and is capable of appropriate automatic switching of the automatic night mode operation.

At least one exemplary embodiment is directed to an optical apparatus which includes a wavelength band selection device, an inserting and removing device, and a brightness detection device. The wavelength band selection device transmits or removes infrared light. The inserting and removing device inserts and removes the wavelength band selection device into and from the optical path of the image pickup optical system. The brightness detection device is provided separately from the image pickup device. The brightness detection range of the brightness detection device can be within the imaging range of the image pickup optical system and is equivalent to or smaller than the imaging range. The inserting and removing device is controlled on the basis of the brightness information of the brightness detection device and the brightness information of an area in the imaging range corresponding to the brightness detection range.

When using the brightness detection device that is disposed at a different position from the image pickup optical system and has a fixed detection range, the apparatus of at least one exemplary embodiment can correctly and surely switch between inserting and removing the wavelength band selection device even if the imaging range (angle of view) of the image pickup optical system changes significantly.

Further features of the present invention will become apparent from the following description of exemplary embodiments (with reference to the attached drawings).

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and circuits (e.g., zoom motor control circuit) and their materials.

In all of the examples illustrated and discussed herein any specific values, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Exemplary embodiments will now be described with reference to the drawings.

First Exemplary Embodiment

Figure 1:
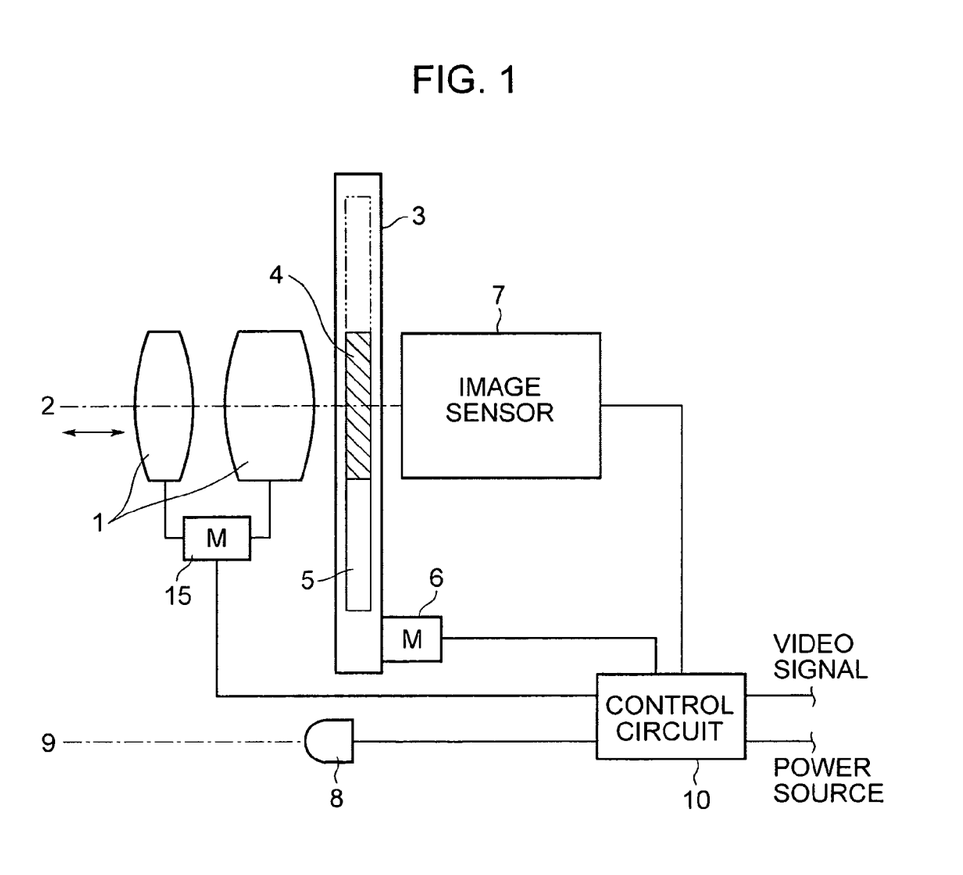
FIG. 1 schematically illustrates the configuration of the image pickup apparatus according to the first to fourth exemplary embodiments of the present invention.

FIG. 1 schematically illustrates the configuration of an image pickup apparatus according to a first exemplary embodiment of the present invention. In the figure, reference numeral 1 denotes an image pickup lens (image pickup optical system), and reference numeral 2 denotes the optical axis of the image pickup lens 1. Reference numeral 3 denotes a filter switching mechanism, which switches between an infrared cut filter (wavelength band selection device) 4 and a transparent plate (optical path length correction device) 5 using a motor 6. Reference numeral 7 denotes an image sensor (e.g., CCD, CMOS). Reference numeral 8 denotes a visible light sensor that detects the illuminance in an imaging range. The spectral sensitivity characteristic of the visible light sensor 8 is equivalent to the spectral sensitivity characteristic of the image sensor (e.g., CCD) 7 combined with the infrared cut filter 4. Reference numeral 9 denotes the optical axis of the visible light sensor 8. Reference numeral 10 denotes a control circuit that controls the image pickup apparatus. Power can be input from the outside and a video signal can be output to the outside. Reference numeral 15 denotes a zoom motor. The zoom motor 15 moves at least part of the image pickup lens 1 along the direction of the optical axis 2, thereby changing the focal length from wide angle to telephoto.

Figure 2:
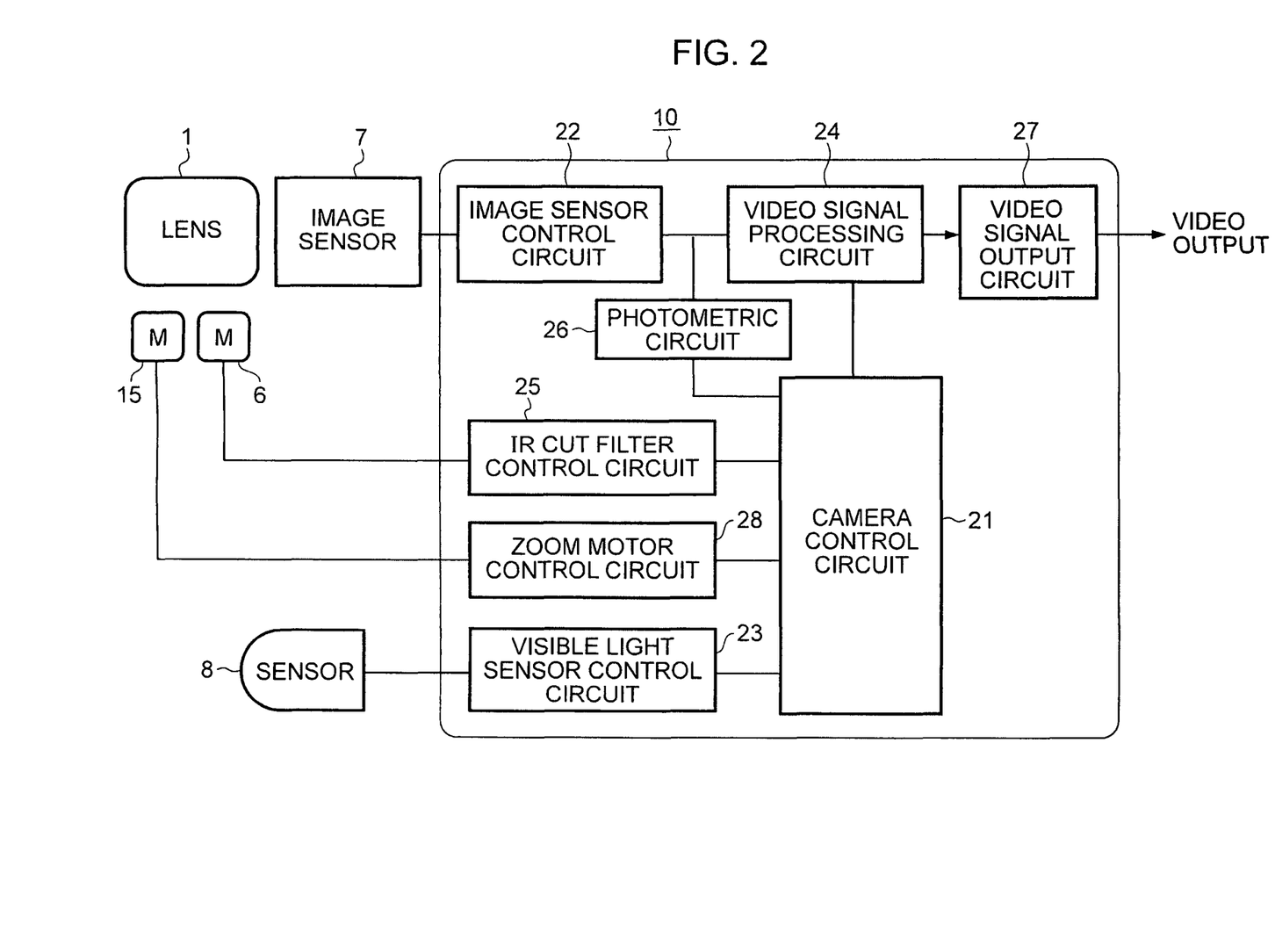
FIG. 2 is a block diagram showing the circuit configuration of the image pickup apparatus according to the first and second exemplary embodiments of the present invention.

FIG. 2 is a block diagram showing the circuit configuration of the image pickup apparatus shown in FIG. 1. As illustrated in FIG. 2, the control circuit 10 of FIG. 1 includes a camera control circuit 21, an image sensor control circuit 22, a visible light sensor control circuit 23, a video signal processing circuit 24, an IR cut filter control circuit 25, a photometric circuit 26, a video signal output circuit 27, and a zoom motor control circuit 28. In FIGS. 1 and 2, the incident light that contributes to the image pickup is incident on the image pickup lens 1, passes through the infrared cut filter 4 or the transparent plate 5, and is then incident on the image sensor 7. The light incident on the image sensor 7 undergoes signal processing in the video signal processing circuit 24, and a color signal or a monochrome signal is output as a video signal from the video signal output circuit 27.

Figure 3:
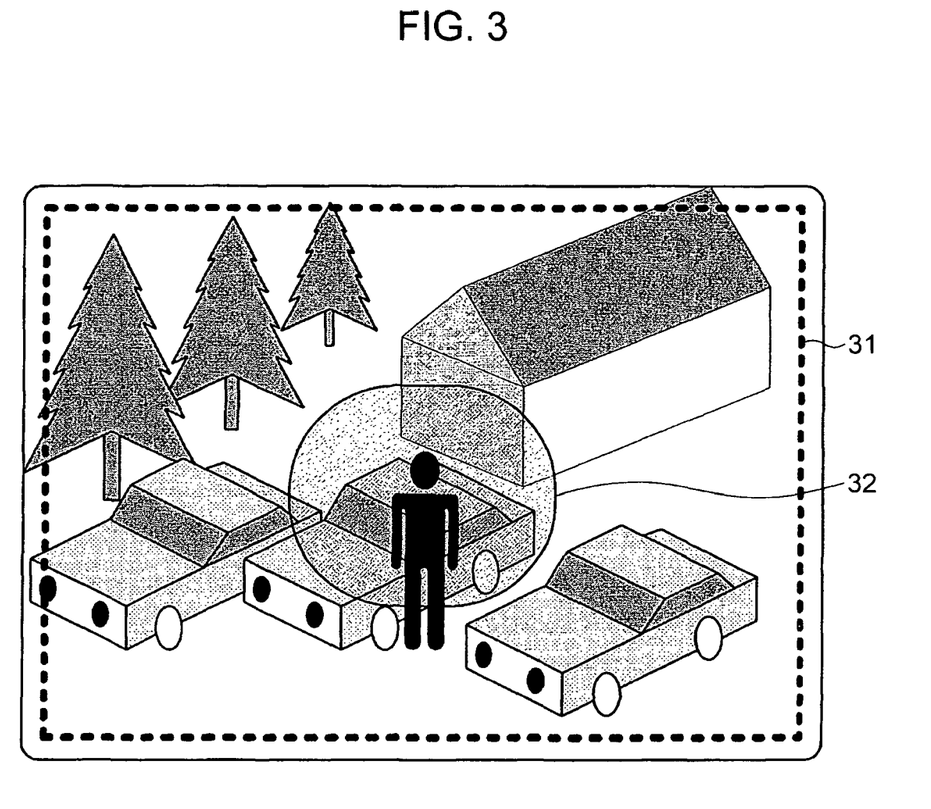
FIG. 3 illustrates the relationship between the imaging range and the illuminance detection range of the visible light sensor in the image pickup apparatus according to the first exemplary embodiment of the present invention.

FIG. 3 illustrates the relationship between the imaging range of the image pickup apparatus shown in FIG. 1 and the illuminance detection range of the visible light sensor 8. Next, the illuminance detection range of the visible light sensor 8 will be described with reference to FIG. 3. In FIG. 3, reference numeral 31 denotes the imaging range (photographing angle of view) of the image pickup apparatus, and reference numeral 32 denotes the illuminance detection range (illuminance detection angle of view) of the visible light sensor 8. As illustrated in FIG. 3, the illuminance detection range 32 is within the imaging range 31. The illuminance detection range 32 is set so as to be also within the angle of view at the wide angle end and the telephoto end of the variable power optical system of the image pickup apparatus. That is to say, the illuminance detection range 32 can be smaller than the imaging range 31 when the variable power optical system is at the telephoto end as well as when the variable power optical system is at the wide angle end. The sensitivity of the visible light sensor 8 is highest in the direction of the optical axis 9. In order to set the illuminance detection range 32 within the imaging range 31, the optical axis 9 is disposed parallel to and in the vicinity of the optical axis 2 of the image pickup lens 1.

In the above-described configuration, in the color photographing mode, the infrared cut filter 4 is inserted between the image pickup lens 1 and the image sensor 7, and a color signal is output as a video signal from the control circuit 10 to the outside. In the monochrome photographing mode, instead of the infrared cut filter 4, the transparent plate 5 is inserted between the image pickup lens 1 and the image sensor 7, and a monochrome signal is output as a video signal from the control circuit 10 to the outside.

Figure 4:
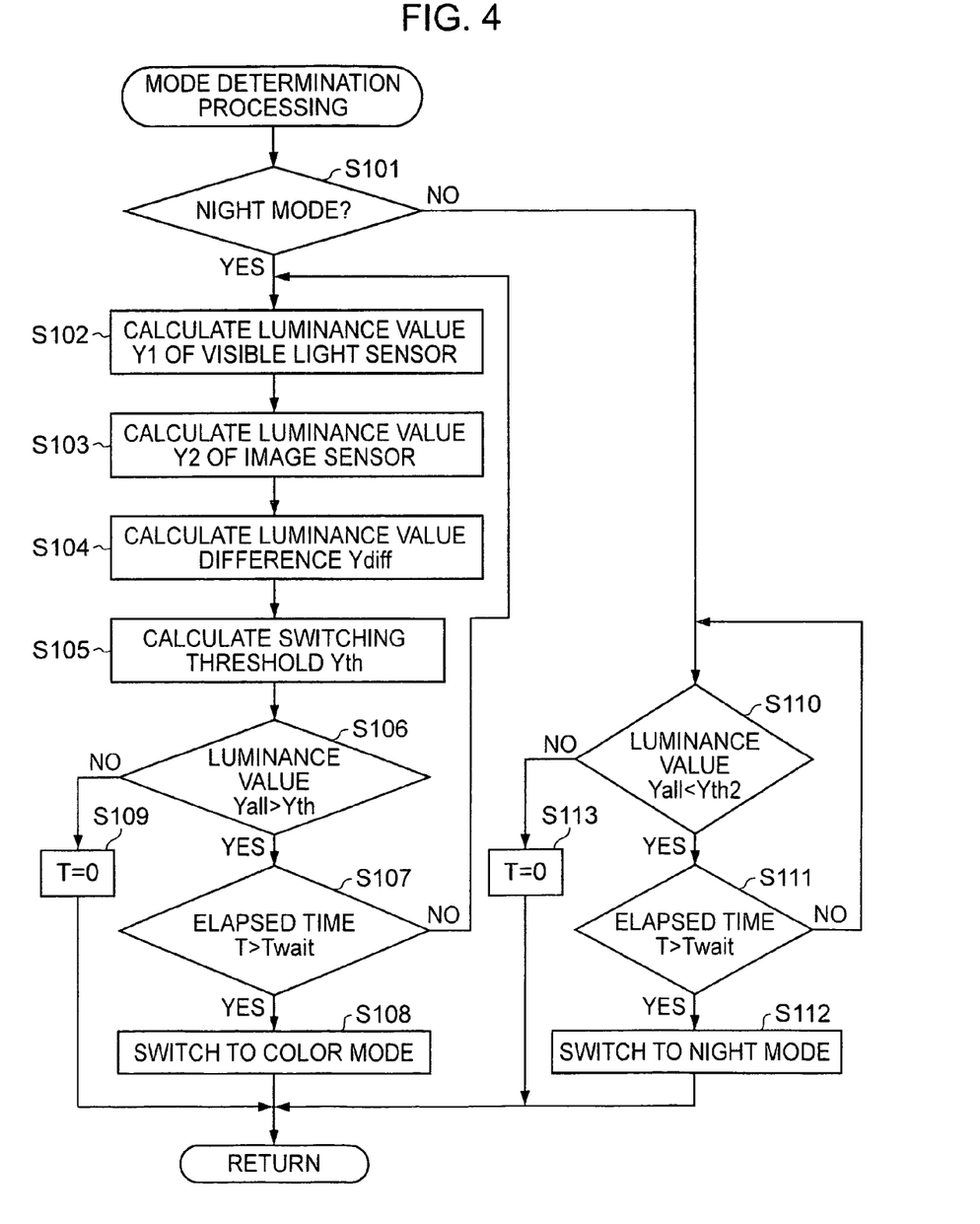
FIG. 4 is a flowchart showing the operation of the image pickup apparatus according to the first exemplary embodiment of the present invention.

FIG. 4 is a flowchart illustrating the operation of the image pickup apparatus shown in FIG. 1. Next, the operation of the control circuit 10 that switches between the color photographing mode and the monochrome photographing mode will be described with reference to the flowchart of FIG. 4. First, in step S101, the camera control circuit 21 determines whether or not the present photographing mode is the night mode. If the present photographing mode is the night mode, in step S102, a luminance value (e.g., brightness) Y1 output from the visible light sensor 8 is calculated. Next, in step S103, a luminance value (e.g., brightness) Y2 of an area on the image sensor 7 equivalent to the detection range of the visible light sensor 8, that is to say, an area equivalent to the illuminance detection range 32 in FIG. 3 is calculated. Next, in step S104, the difference Ydiff between the luminance value Y1 of the visible light sensor 8 calculated in step S102 and the luminance value Y2 of the image sensor 7 calculated in step S103 is calculated. The calculated difference Ydiff is a luminance component that comes from a light component cut by the infrared cut filter 4, that is to say, a light component of a wavelength longer than that of visible light. The difference Ydiff is zero in a light source environment that contains no infrared component, and increases with the increasing amount of the infrared component.

In step S105, on the basis of the luminance value Ydiff of the infrared component obtained in step S104; a threshold Yth for determining switching of the photographing mode from the night mode to the color mode is calculated. The luminance value Yall of the entire imaging range 31 on the image sensor 7 is compared with the threshold Yth. For example, in the case where the light source contains no infrared component, when a threshold for switching from the night mode to the color mode is Yth1, and a rate of threshold increase according to the infrared component Ydiff is coefficient α, the threshold Yth can be obtained from the following equation (1):

$$Yth = Yth1 + (\alpha * Ydiff) \quad (1)$$

As is clear from equation (1), the switching threshold Yth increases with the increasing amount of the infrared component of a light source irradiating the subject. If a light source contains a large infrared component, the photographing mode is not switched from the night mode to the color mode until the luminance value Yall of the image sensor rises to a high luminance according to the amount of the infrared component.

For example, in the case where the luminance value Yall of the image sensor 7 exceeds the switching threshold Yth1 in a light source environment that contains a large infrared component and small visible light component, if the infrared cut filter 4 is simply inserted, the luminance value Yall of the image sensor 7 falls suddenly. Thus, the luminance value Yall falls below the threshold, and the photographing mode is returned to the monochrome mode. Such operations are repeated, and hunting between the modes occurs. At least one exemplary embodiment can reduce such a phenomenon. In addition, it is clear that fitness can be further improved by taking into account the rate of the illuminance detection range to the imaging range in the above equation.

In step S106, the luminance value Yall of the entire imaging range 31 on the image sensor 7 is compared with the threshold Yth obtained in step S105. If the luminance value Yall exceeds the threshold Yth, it is determined in step S107 whether or not the luminance value (e.g., brightness) of the subject stably exceeds the threshold Yth for a predetermined time Twait. If the luminance value (e.g., brightness) of the subject is stable, in step S108, the photographing mode is switched from the night mode to the color mode. In this way, it can be distinguished whether or not a luminance increase is temporary, and hunting can be prevented from occurring or reduced. If the luminance value Yall is less than or equal to the threshold Yth in step S106, the elapsed time T used in step S107 is cleared in step S109.

If the present photographing mode is not the night mode in step S101, the process proceeds to step S110. The luminance value Yall of the entire imaging range 31 on the image sensor 7 is compared with a predetermined switching threshold Yth2. If the luminance value Yall is below the threshold Yth2, it is determined in step S111 whether or not the luminance value (e.g., brightness) of the subject is stably below the threshold Yth2 for a predetermined time Twait. If the luminance value (e.g., brightness) of the subject is stable, in step S112, the photographing mode is switched from the color mode to the night mode. In this way, it can be distinguished whether or not a luminance decrease is temporary, and hunting can be prevented from occurring or reduced. If the luminance value Yall is greater than or equal to the threshold Yth2 in step S110, the elapsed time T used in step S111 is cleared in step S113.

As described above, in the present exemplary embodiment, determination is performed on the basis of the luminance value output from the visible light sensor 8 and the luminance value of an area equivalent to the detection range 32 of the visible light sensor 8 selected from the entire range of the image sensor 7. In this way, the amount of infrared component contained in the luminance information obtained from the reflection off the subject can be known. That is to say, switching between the color photographing mode and the monochrome photographing mode can be appropriately performed.

Second Exemplary Embodiment

Figure 5:
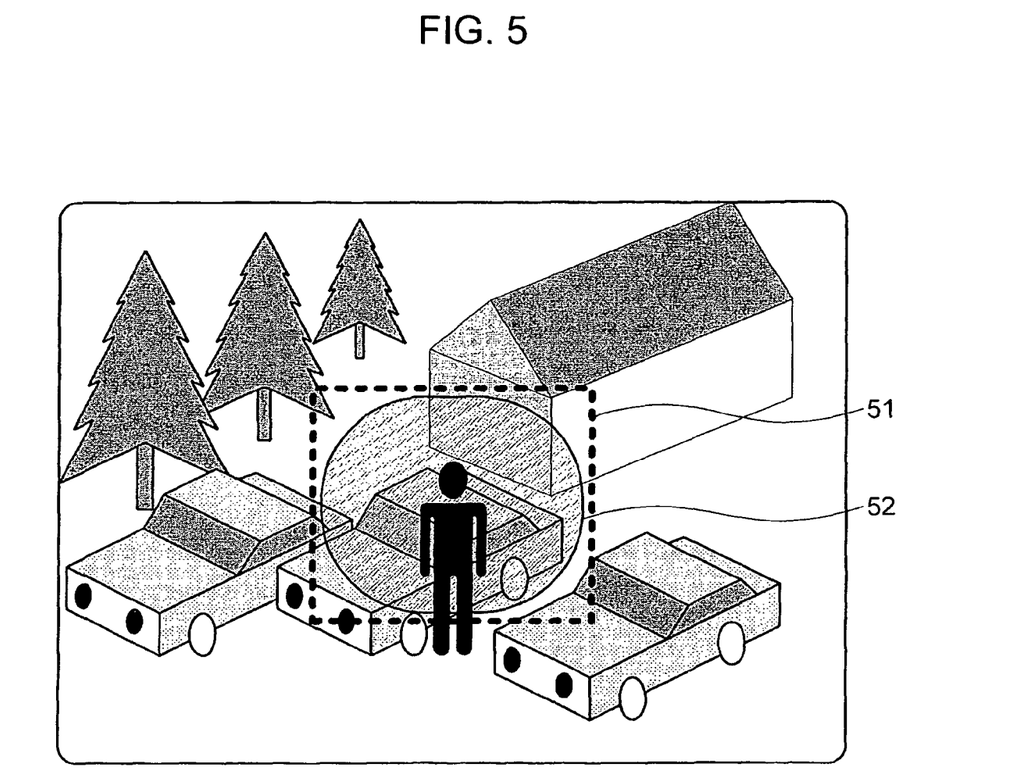
FIG. 5 illustrates the relationship between the imaging range and the illuminance detection range of the visible light sensor in the image pickup apparatus according to the second exemplary embodiment of the present invention.
Figure 6:
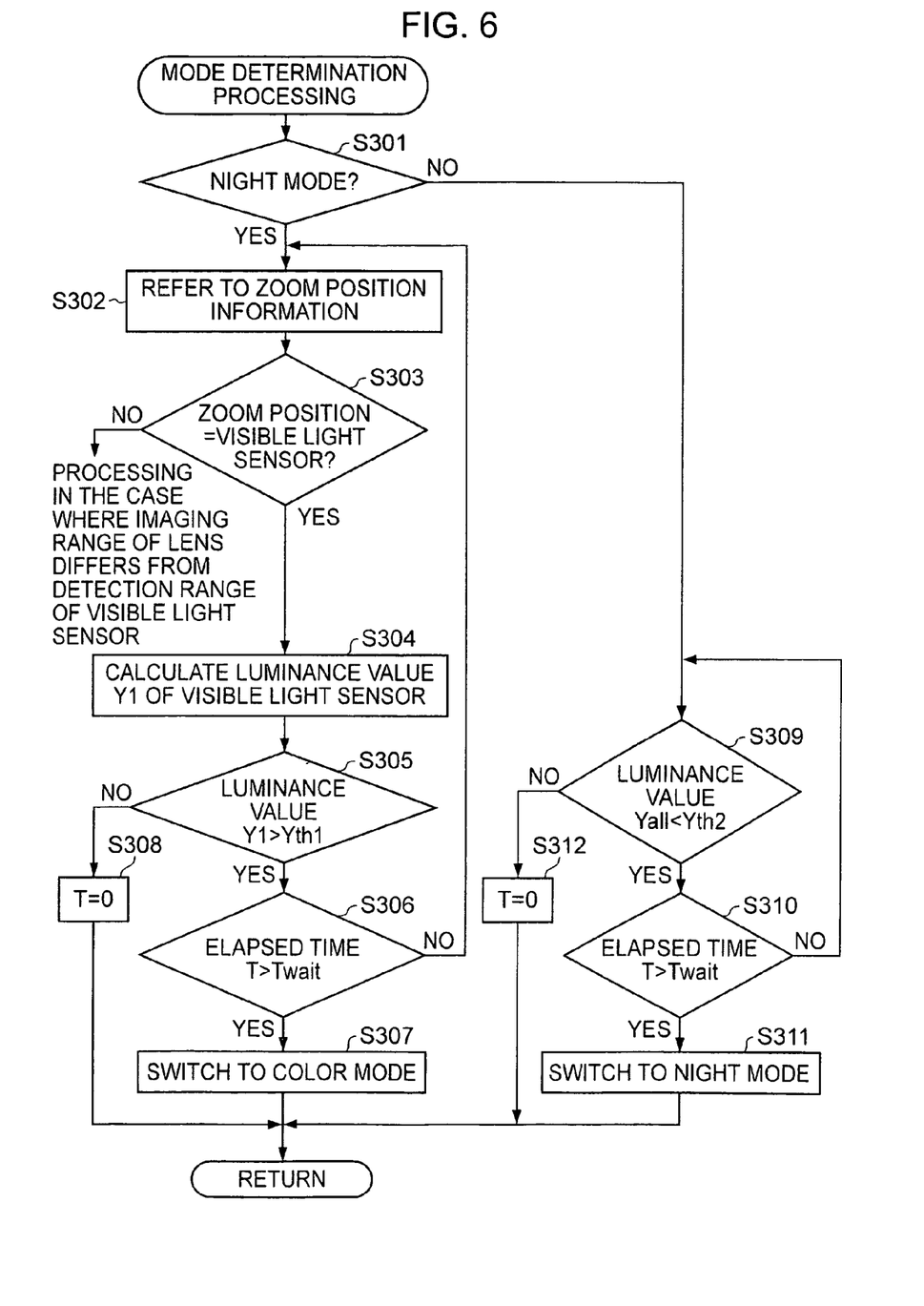
FIG. 6 is a flowchart showing the operation of the image pickup apparatus according to the second exemplary embodiment of the present invention.

A second exemplary embodiment will be described with reference to FIGS. 1, 2, 5 and 6. The hardware configuration of this exemplary embodiment is the same as that of the first exemplary embodiment (FIGS. 1 and 2). However, the software operating the camera control circuit 21 of the control circuit 10 of this exemplary embodiment is different from that of the first exemplary embodiment. FIG. 5 illustrates the relationship between the imaging range of the image pickup apparatus shown in FIG. 1 and the illuminance detection range of the visible light sensor 8 in this exemplary embodiment. FIG. 6 is a flowchart showing the operation of this exemplary embodiment.

First, the illuminance detection range of the visible light sensor 8 will be described with reference to FIG. 5. In the figure, reference numeral 51 denotes the imaging range of the image pickup apparatus, and reference numeral 52 denotes the illuminance detection range of the visible light sensor 8. As shown, the position and the area of the illuminance detection range 52 are substantially equivalent to those of the imaging range 51. The sensitivity of the visible light sensor 8 is highest in the direction of the optical axis 9. In order to set the illuminance detection range 52 within the imaging range 51, the optical axis 9 is disposed parallel to and in the vicinity of the optical axis 2 of the image pickup lens 1. The visible light sensor 8 is located, for example, inside the lens barrel of the image pickup lens 1, and at a position such that the visible light sensor 8 is out of the angle of view of the image sensor 7 even when the image pickup lens 1 is set to the wide angle end.

In the above-described configuration, in the color photographing mode, the infrared cut filter 4 is inserted between the image pickup lens 1 and the image sensor 7, and a color signal is output as a video signal from the control circuit 10 to the outside. In the monochrome photographing mode, the transparent plate 5 is inserted between the image pickup lens 1 and the image sensor 7, and a monochrome signal is output as a video signal from the control circuit 10 to the outside.

Next, the operation of the control circuit 10 that switches between the color photographing mode and the monochrome photographing mode, in the case where the position and the area of the illuminance detection range are substantially equivalent to those of the imaging range, will be described with reference to the flowchart of FIG. 6. First, in step S301, the camera control circuit 21 determines whether or not the present photographing mode is the night mode. If the present photographing mode is the night mode, first, in step S302, the present zoom position of the lens is referred to, and the imaging range 51 of the lens is calculated from the zoom position information. Next, in step S303, it is determined whether or not the present imaging range 51 of the lens calculated in step S302 and the illuminance detection range 52 of the visible light sensor 8 are both within a predetermined range. If the imaging range 51 is substantially the same as the illuminance detection range 52 of the visible light sensor 8, in step S304, a luminance value Y1 output from the visible light sensor 8 is calculated. In step S305, the luminance value Y1 output from the visible light sensor 8 is compared with a predetermined switching threshold Yth1. If the luminance value Y1 exceeds the threshold Yth1, it is determined in step S306 whether or not the luminance value (e.g., brightness) of the subject stably exceeds the threshold Yth1 for a predetermined time Twait. If the luminance value (e.g., brightness) of the subject is stable, in step S307, the photographing mode is switched from the night mode to the color mode. In this way, it can be distinguished whether or not a luminance increase is temporary, and hunting can be prevented from occurring or reduced.

If the luminance value Y1 is determined as less than or equal to the switching threshold Yth1 in step S305, the elapsed time T used in step S306 is cleared in step S308. If the present photographing mode is not the night mode in step S301, determination for switching from the color mode to the night mode is performed in steps S309 to S312, as in steps S110 to S113 of the first exemplary embodiment.

If, in step S303, at least one of the present imaging range 51 of the lens calculated in step S302 and the illuminance detection range 52 of the visible light sensor 8 is not within the predetermined range, the information from the image sensor 7 is used in addition to the information from the visible light sensor 8. For example, in the case where at least one of the present imaging range 51 of the lens and the detection range 52 of the visible light sensor 8 is not within the predetermined range, and the illuminance detection range 52 of the visible light sensor 8 is within and smaller than the present imaging range 51, the photographing mode is determined, as in the first exemplary embodiment, on the basis of the luminance value of an area on the image sensor 7 equivalent to the detection range 52 of the visible light sensor 8, and the luminance (e.g., brightness) information of the visible light sensor 8.

As described above, the imaging range 51 of the lens is compared with the illuminance detection range 52 of the visible light sensor 8, and if the imaging range 51 is substantially the same as the brightness detection range 52 of the visible light sensor 8, determination is performed on the basis of the luminance information output from the visible light sensor 8. In this way, switching between the color photographing mode and the monochrome photographing mode can be appropriately performed.

Third Exemplary Embodiment

Figure 7:
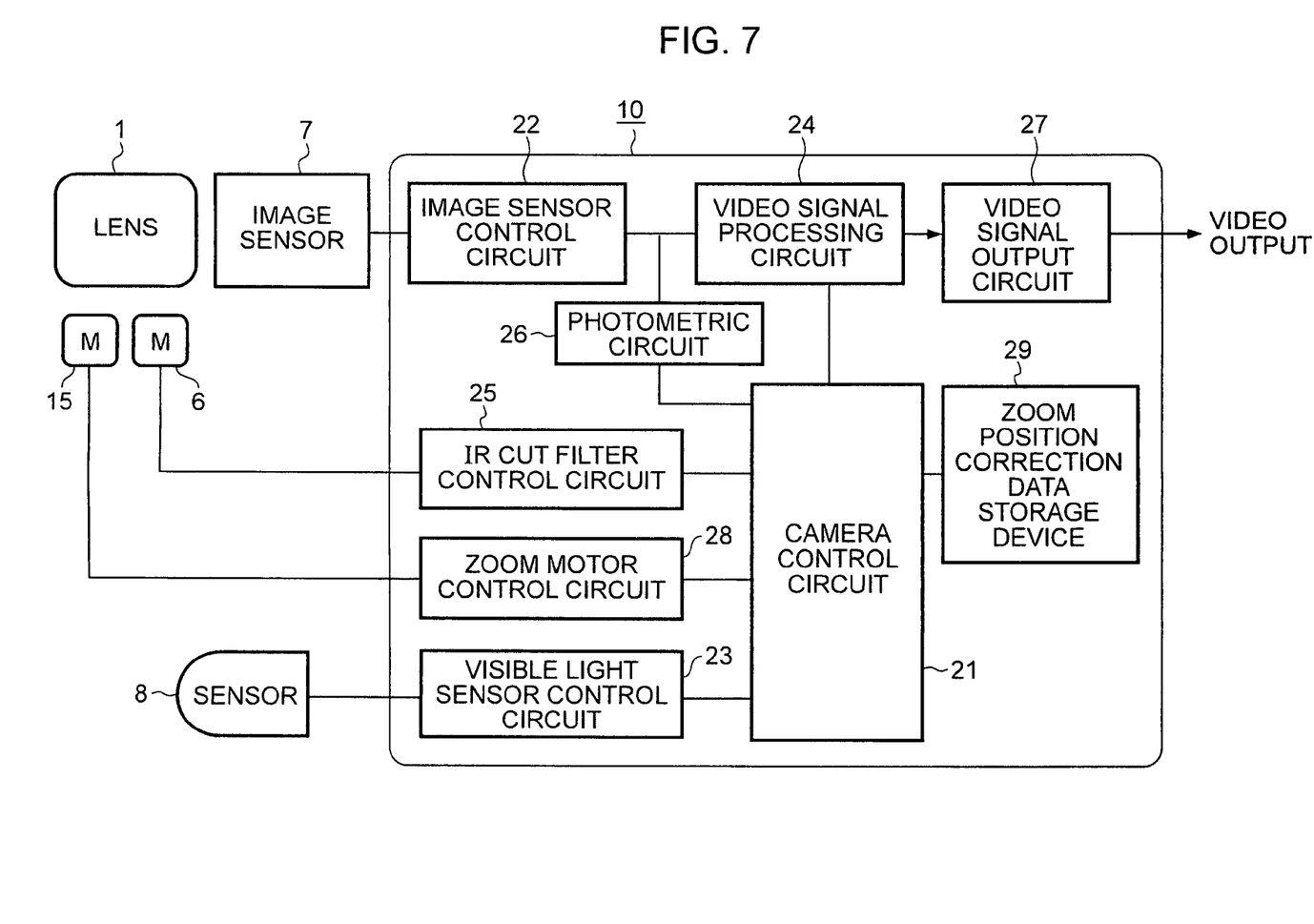
FIG. 7 is a block diagram showing the circuit configuration of the image pickup apparatus according to the third exemplary embodiment of the present invention.
Figure 8:
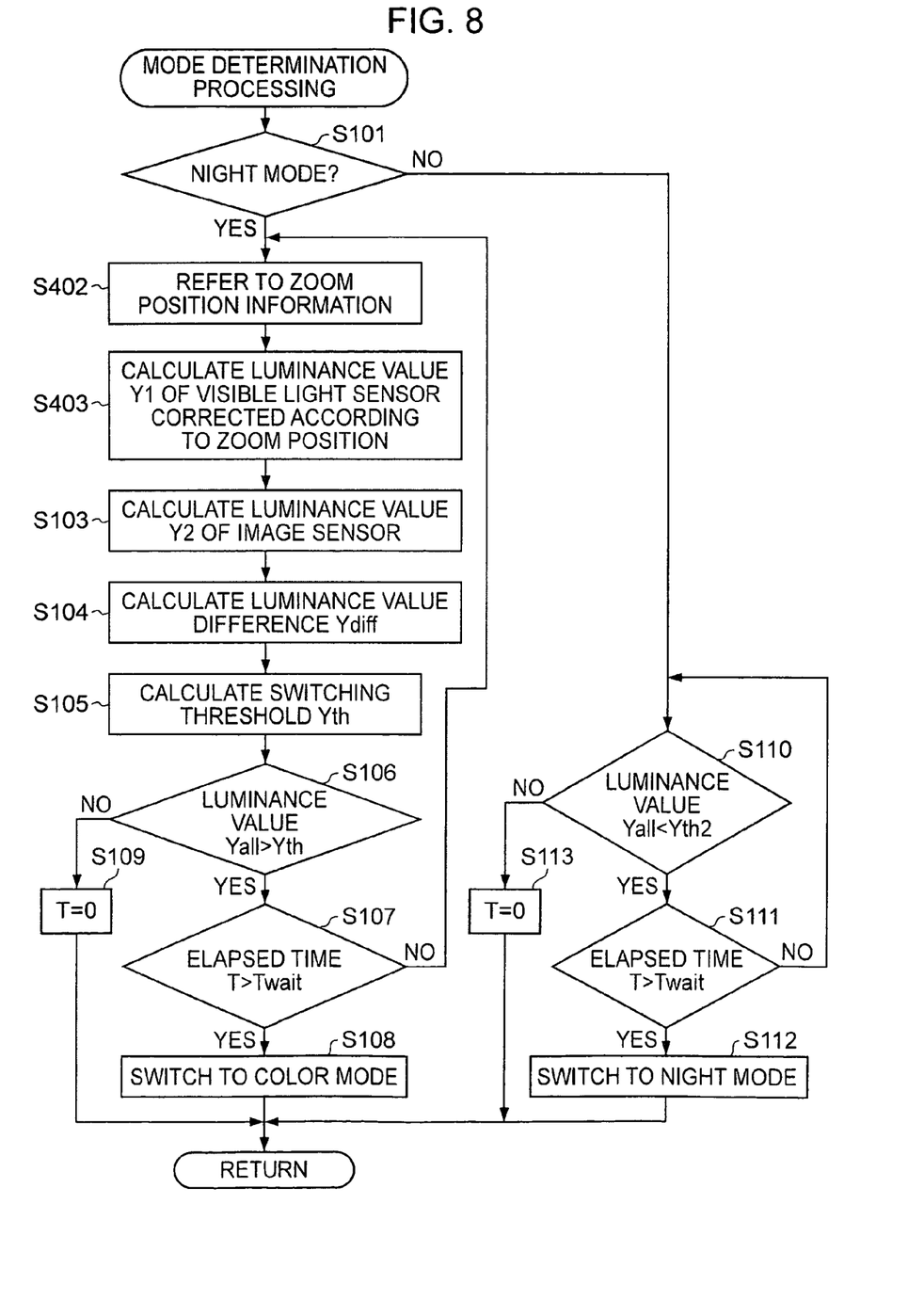
FIG. 8 is a flowchart showing the operation of the image pickup apparatus according to the third exemplary embodiment of the present invention.
Figure 9:
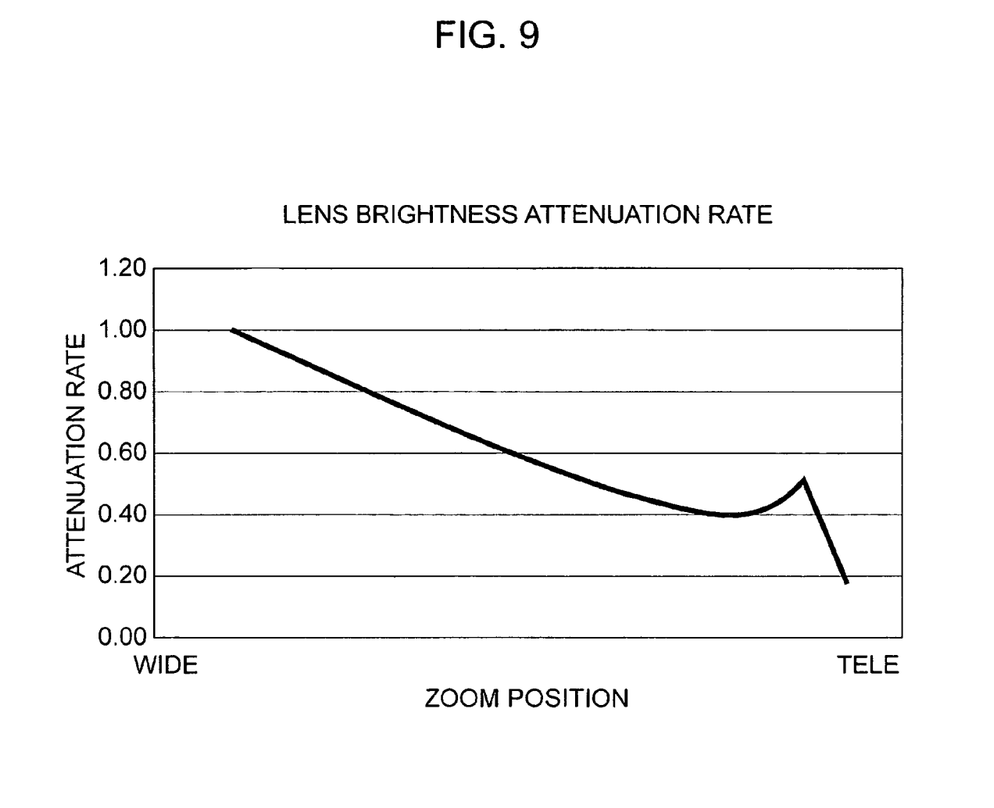
FIG. 9 illustrates the variation characteristic in F-number of an image pickup lens, which can have a zoom mechanism with the diaphragm mechanism open in the image pickup apparatus according to the third and fourth exemplary embodiments of the present invention.

A third exemplary embodiment will be described with reference to FIGS. 1, 3, 7, 8, and 9. The configuration of the optical system of this exemplary embodiment is the same as that of the first exemplary embodiment (FIG. 1). As for the control circuit 10 of this exemplary embodiment (FIG. 7), a zoom position correction data storage device 29 is added to the control device 10 of the first exemplary embodiment (FIG. 2). The software operating the camera control circuit 21 of the control circuit 10 of this exemplary embodiment (FIG. 8) is also different from that of the first exemplary embodiment. FIG. 7 is a block diagram showing the circuit configuration of the image pickup apparatus shown in FIG. 1. FIG. 8 is a flowchart showing the operation of this exemplary embodiment. FIG. 9 illustrates the variation characteristic in F-number of an image pickup lens, which can have a zoom mechanism with the diaphragm mechanism open.

As for FIG. 1 schematically illustrating the configuration of the image pickup apparatus and FIG. 3 illustrating the relationship between the imaging range and the illuminance detection range of the visible light sensor, their descriptions will be omitted because they have already been described in the first exemplary embodiment. First, the control circuit 10 in FIG. 7 will be described. The control circuit 10 includes a camera control circuit 21, an image sensor control circuit 22, a visible light sensor control circuit 23, a video signal processing circuit 24, an IR cut filter control circuit 25, a photometric circuit 26, a video signal output circuit 27, a zoom motor control circuit 28, and a zoom position correction data storage device 29. The incident light that contributes to the image pickup is incident on the image pickup lens 1 in FIG. 1, passes through the infrared cut filter 4 or the transparent plate 5, and is then incident on the image sensor 7. The light incident on the image sensor 7 undergoes signal processing in the video signal processing circuit 24, and a color signal or a monochrome signal is output as a video signal from the video signal output circuit 27.

Next, FIG. 9 showing the variation characteristic in F-number of an image pickup lens, which can have a zoom mechanism with the diaphragm mechanism open, will be described. In general, in an image pickup lens, which can have a zoom mechanism, when the zoom position is changed from the wide angle end to the telephoto end, the F-number which indicates the brightness of the lens changes according to the zoom position. When the F-number (lens brightness) at the wide angle end is 1.0 and the zoom position is changed toward the telephoto end, the F-number changes as illustrated in FIG. 9. This characteristic is lens-specific, and lenses of different optical design have different F-number variation characteristics. However, lenses of the same optical design have substantially the same F-number variation characteristic. The data of F-number variation characteristic can be obtained in advance in the design phase.

In the present exemplary embodiment, the visible light sensor 8 is disposed at a different position from the image pickup optical system 1. The luminance information of the visible light sensor 8 is compared with the luminance information of the image sensor 7, which receives light via the optical system 1, which can have a zoom mechanism. Therefore, it can be necessary in some circumstances to consider the zoom position. Let's assume, for example, a case where the zoom position is halfway between the wide angle end and the telephoto end (hereinafter referred to as "middle"). From the F-number characteristic diagram of FIG. 9, the F-number attenuation rate of the optical system 1 is 0.8 times that of the wide angle end. That is to say, when the same amount of light is received at the lens entrance, the brightness at the middle position is only 80% of that at the wide angle end. Here, the visible light sensor 8 is supposed to show the luminance value of the image sensor 7 provided with the IR cut filter 4. However, if the photographing mode is determined without considering the attenuation of 80% and is switched to the color photographing mode, the luminance value decreases significantly and an image satisfying the intended photographing luminance cannot be obtained or is difficult to obtain. That is to say, if the luminance information obtained from the visible light sensor 8 is not corrected according to the zoom position, determination is performed on the basis of incorrect luminance information of the visible light sensor 8. Thus, determination for switching of the photographing mode cannot be appropriately performed or is difficult.

Next, the operation of the control circuit 10 in the case where the luminance value of the visible light sensor 8 is corrected or error reduced according to the zoom position will be described with reference to the flowchart of FIG. 8. Here, the difference from the first exemplary embodiment will be mainly described. First, in step S101, the camera control circuit 21 determines whether or not the present photographing mode is the night mode. If the present photographing mode is the night mode, in step S402, the present zoom position of the lens is referred to. Next, in step S403, the luminance value obtained from the visible light sensor 8 is corrected or error reduced on the basis of the zoom position correction data stored in the zoom position correction data storage device 29. The visible light luminance information for example equivalent to the lens brightness of the image pickup lens 1 at the present zoom position is then calculated. Thereafter, as in the first exemplary embodiment, the luminance information obtained in step S403 is compared with the luminance information from the image sensor 7, and thereby determination for switching of the photographing mode is performed.

As described above, in the present exemplary embodiment, the luminance information obtained from the visible light sensor 8 is corrected or error reduced on the basis of the correction information according to the zoom position of the image pickup optical system stored in the zoom position correction data storage device 29. By using the corrected value for determining switching of the photographing mode, switching between the color photographing mode and the monochrome photographing mode can be appropriately performed.

Fourth Exemplary Embodiment

Figure 10:
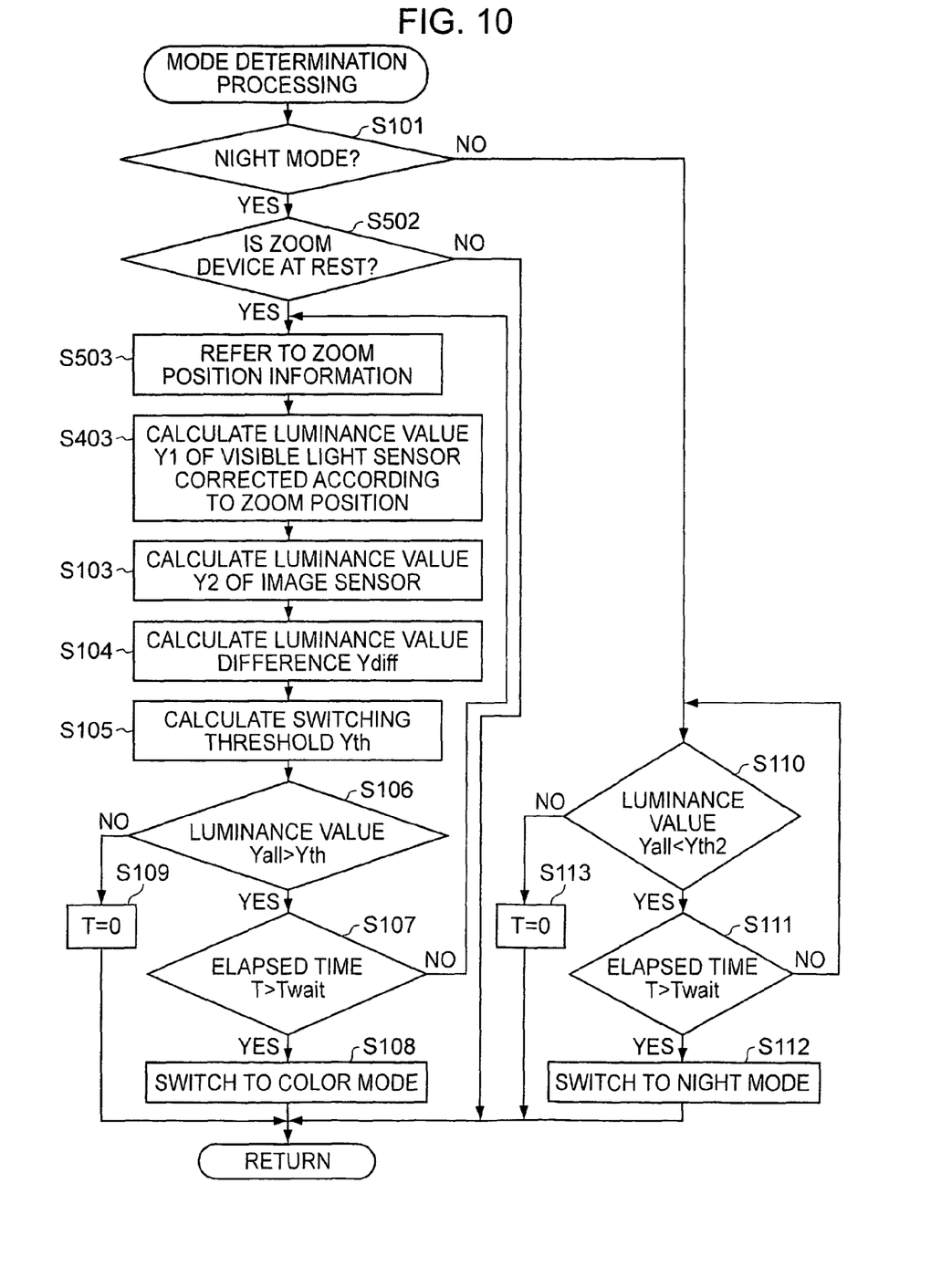
FIG. 10 is a flowchart showing the operation of the image pickup apparatus according to the fourth exemplary embodiment of the present invention.

A fourth exemplary embodiment will be described with reference to FIGS. 1, 3, 7, and 10. The configurations of the optical system and the control circuit (FIG. 7) of this exemplary embodiment are the same as those of the third exemplary embodiment (FIGS. 1 and 7). The software operating the camera control circuit 21 of the control circuit 10 of this exemplary embodiment (FIG. 10) is different from that of the third exemplary embodiment. FIG. 10 is a flowchart showing the operation of the fourth exemplary embodiment of the present invention. As for FIGS. 1 and 3, their descriptions will be omitted because they have already been described. As for the block diagram of the control circuit 10 shown in FIG. 7, its description will be also omitted because it has already been described in the third exemplary embodiment.

Next, the operation of the control circuit 10 will be described with reference to the flowchart of FIG. 10. In the case where the luminance value of the visible light sensor 8 is corrected or error reduced according to the zoom position, the control circuit 10 checks whether or not the zoom lens is at rest and then switches between the color photographing mode and the monochrome photographing mode. The general flow of the process of correcting or reducing the error in the luminance information of the visible light sensor 8 with reference to the zoom position and determining the photographing mode has already been described in the first and third exemplary embodiments. Therefore, only the difference will be described.

First, in step S101, the camera control circuit 21 determines whether or not the present photographing mode is the night mode. If the present photographing mode is the night mode, in step S502, it is determined whether or not the zoom device is now moving. If the zoom device is at rest, in step S503, the present zoom position of the lens is referred to. Next, in step S403, the luminance value obtained from the visible light sensor 8 is corrected or error reduced on the basis of the zoom position correction data stored in the zoom position correction data storage device 29. The visible light luminance information equivalent to the lens brightness of the image pickup lens 1 at the present zoom position is then calculated. Thereafter, as in the third exemplary embodiment, the luminance information obtained in step S403 is compared with the luminance information from the image sensor 7, and thereby determination for switching of the photographing mode is performed. If the zoom device of the lens is now moving in step S502, the series of determinations for switching of the photographing mode are not performed and the present photographing mode is maintained.

As described above, in the present exemplary embodiment, the luminance information obtained from the visible light sensor 8 is corrected or error reduced on the basis of the correction information according to the zoom position of the image pickup optical system stored in the zoom position correction data storage device 29. It is determined whether or not the zoom device is now moving, and only when the zoom device is at rest, determination for switching of the photographing mode is performed. In this way, the luminance information of the visible light sensor 8 can be stably corrected even when F-number (lens brightness) varies depending on the zoom position. Therefore, switching between the color photographing mode and the monochrome photographing mode can be appropriately performed. Instead of the visible light sensor 8, an infrared light sensor can be used as the brightness detection device. For example, in the first exemplary embodiment, the luminance value (e.g., brightness information) Ydiff of the infrared component is obtained as the difference between the luminance value (e.g., brightness information) Y1 of the visible light sensor 8 and the luminance value (e.g., brightness information) Y2 of the image sensor 7. In contrast, in the case where the luminance value (e.g., brightness information) of the infrared component is obtained using an infrared light sensor, the luminance value Y1 of visible light is obtained as the difference between the luminance value Y2 of the image sensor 7 and the luminance value of the infrared light sensor. In the above, switching from the day mode to the night mode is performed on the basis of the luminance value of the image sensor 7, that is to say, the sum of the infrared light component and the visible light component. Alternatively, the switching can be performed on the basis of the luminance value of the visible light sensor 8.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-129328 filed Apr. 27, 2005, which is hereby incorporated by reference herein in its entirety.

What is claimed is:
1. An optical apparatus comprising:
an image pickup device;
an image pickup optical system configured to focus light beams from a subject on the image pickup device as a subject image;
an optical filter disposed to be inserted into and removed from an optical path of the image pickup optical system and configured to transmit light beams in a first wavelength band and cut light beams in a second wavelength band, in which a wavelength is longer than that in the first wavelength band, among the light beams incident on the image pickup device from the subject;

a subject luminance detection sensor configured to detect the light beams in the first wavelength band and not detect the light beams in the second wavelength band, among the light beams from the subject; and a controller configured to determine whether the optical filter is to be inserted into or removed from the optical path of the image pickup optical system, wherein the image pickup optical system includes a variable power optical system, and an imaging range of the image pickup optical system changes as the variable power optical system changes the magnification, wherein the subject luminance detection sensor does not include a variable power optical system, wherein an illuminance detection range of the subject luminance detection sensor is within the imaging range of the image pickup optical system, wherein the controller determines whether or not the optical filter is to be inserted into the optical path of the image pickup optical system, based on first luminance information obtained by detecting the light beams in the first wavelength band and not detecting the light beams in the second wavelength band by the subject luminance detection sensor, when the position and the area of the illuminance detection range are substantially equivalent to those of the imaging range, and wherein the controller determines whether or not the optical filter is to be inserted into the optical path of the image pickup optical system, based on first luminance information obtained by detecting the light beams in the first wavelength band and not detecting the light beams in the second wavelength band by the subject luminance detection sensor and second luminance information limited to an area equivalent to the illuminance detection range on the image pickup device, when the illuminance detection range is smaller than the imaging range.

2. An optical apparatus comprising:

an image pickup device;

an image pickup optical system configured to focus light beams from a subject on the image pickup device as a subject image;

an optical filter disposed to be inserted into and removed from an optical path of the image pickup optical system and configured to transmit light beams in a first wavelength band and cut light beams in a second wavelength band, in which a wavelength is longer than that in the first wavelength band, among the light beams incident on the image pickup device from the subject;

a subject luminance detection sensor configured to detect the light beams in the second wavelength band and not detect the light beams in the first wavelength band, among the light beams from the subject; and a controller configured to determine whether the optical filter is to be inserted into or removed from the optical path of the image pickup optical system, wherein the image pickup optical system includes a variable power optical system, and an imaging range of the image pickup optical system changes as the variable power optical system changes the magnification, wherein the subject luminance detection sensor does not include a variable power optical system, wherein an illuminance detection range of the subject luminance detection sensor is within the imaging range of the image pickup optical system, wherein the controller determines whether or not the optical filter is to be inserted into the optical path of the image pickup optical system, based on first luminance information obtained by detecting the light beams in the second wavelength band and not detecting the light beams in the first wavelength band by the subject luminance detection sensor, when the position and the area of the illuminance detection range are substantially equivalent to those of the imaging range, and wherein the controller determines whether or not the optical filter is to be inserted into the optical path of the image pickup optical system, based on first luminance information obtained by detecting the light beams in the second wavelength band and not detecting the light beams in the first wavelength band by the subject luminance detection sensor and second luminance information limited to an area equivalent to the illuminance detection range on the image pickup device, when the illuminance detection range is smaller than the imaging range.

* * * * *